(12) United States Patent
Raaf (10) Patent No.: US 8,064,525 B2
(45) Date of Patent: Nov. 22, 2011

(54) METHOD AND APPARATUS FOR TRANSMITTING DATA FRAMES, AND A METHOD AND APPARATUS FOR DATA RATE MATCHING

(75) Inventor: Bernhard Raaf, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 345 days.

(21) Appl. No.: 11/956,195

(22) Filed: Dec. 13, 2007

(65) Prior Publication Data

US 2008/0089360 A1    Apr. 17, 2008

Related U.S. Application Data

(63) Continuation of application No. 10/110,183, filed on Apr. 8, 2002, now Pat. No. 7,346,646.

(51) Int. Cl.
*H04B 1/66* (2006.01)

(52) U.S. Cl. .................................................. 375/240.24

(58) Field of Classification Search .................. 375/214, 375/240, 240.23, 240.24, 240.27, 265, 130, 375/147, 267, 377, 295; 370/477, 470, 472, 370/473, 545, 342, 326, 336; 714/790, 701, 714/791, 786, 755, 787, 781
See application file for complete search history.

(56) References Cited

U.S. PATENT DOCUMENTS

| | | | |
|---|---|---|---|
| 5,909,434 A * | 6/1999 | Odenwalder et al. | 370/342 |
| 6,233,253 B1 | 5/2001 | Settle et al. | 370/474 |
| 6,247,072 B1 | 6/2001 | Firestone | 710/53 |
| 6,289,486 B1 | 9/2001 | Lee et al. | 714/788 |
| 6,307,867 B1 | 10/2001 | Roobol et al. | 370/470 |
| 6,370,669 B1 | 4/2002 | Eroz et al. | 714/774 |
| 6,397,367 B1 | 5/2002 | Park et al. | 714/786 |
| 6,400,703 B1 | 6/2002 | Park et al. | 370/342 |
| 6,430,722 B1 | 8/2002 | Eroz et al. | 714/755 |
| 6,516,441 B1 | 2/2003 | Kim et al. | 714/774 |
| 6,560,439 B1 | 5/2003 | Grayson | 455/12.1 |
| 6,580,762 B1 | 6/2003 | Tsumura | 375/295 |
| 6,671,851 B1 | 12/2003 | Moulsley | 714/790 |
| 6,744,744 B1 | 6/2004 | Tong et al. | 370/320 |
| 7,082,565 B1 * | 7/2006 | Michel et al. | 714/790 |
| 7,089,480 B2 | 8/2006 | Yun et al. | 714/790 |

(Continued)

FOREIGN PATENT DOCUMENTS

EP    0912009    4/1999

(Continued)

OTHER PUBLICATIONS

3$^{rd}$Generation Partnership Project (3GPP); Techinical Specification Group (TSG); Working Group 1 (WG1); Multiplexing and Channel Coding (FDD). TS 25.212 V2.3.0 (52 pages) Oct. 1, 1999.

(Continued)

*Primary Examiner* — Hanh Nguyen
(74) *Attorney, Agent, or Firm* — King & Spalding L.L.P.

(57) ABSTRACT

A method and apparatus for transmitting data frames, and a method and apparatus for data rate matching wherein, via an interleaver, elements to be transmitted are distributed over a plurality of radio frames and repeated, the repetition being carried out in such a way that, when put into its relationship with the original arrangement of the elements before the interleaving, the pattern prevents the spacing between arbitrary consecutive repeated elements from being substantially greater than the mean repetition spacing.

6 Claims, 6 Drawing Sheets

U.S. PATENT DOCUMENTS

| | | | |
|---|---|---|---|
| 7,187,699 B1 * | 3/2007 | Raaf et al. | 370/545 |
| 7,346,646 B1 * | 3/2008 | Raaf | 709/200 |
| 7,346,835 B1 * | 3/2008 | Lobinger et al. | 714/790 |
| 2005/0003836 A1 | 1/2005 | Inoue et al. | 455/458 |

FOREIGN PATENT DOCUMENTS

| | | |
|---|---|---|
| EP | 912009 A2 * | 4/1999 |
| EP | 1069798 | 1/2001 |
| WO | WO9716899 | 5/1997 |

OTHER PUBLICATIONS

3$^{rd}$ Generation Partnership Project; Technical Specification Group Radio Access Network; Multiplexing and Channel Coding (FDD). TS 25.212 V3.11.0 (62 pages) Sep. 1, 2002.

"Optimized Rate Matching After Interleaving" TSG-RAN Working Group 1 (Radio) Meeting #3 (4 pages) Mar. 1, 1999.

Adi et al., "Variable Redundancy Coding for Mobile Channels" Institute for Computer and Communication Networks Engineering, Technical University of Braunschweig, Germany (5 pages) 2001.

Frenger et al., "Rate Matching in Multichannel Systems using RCPC-Codes" Department of Information Theory, Chalmers University of Technology, Sweden (4 pages) 1997.

Lin et al., "A New Implementation Algorithm for multiplexing and Channel Coding Scheme in WCDMA" State Key Lab on Microwave and Digital Communications, Tsinghua University, Beijing (4 pages) 2000.

"Properties of Optimised Puncturing Scheme" TSG-RAN Working Group 1 Meeting No. 5 (4 pages) Jun. 1, 1999.

3$^{rd}$ Generation Partnership Project (3GPP); Technical Specification Group (TSG) Radio Access Network (RAN); Working Group 1 (WG1); Multiplexing and Channel Coding (FDD). TS 25.212 V2.0.0 (38 pages) Jun. 1, 1999.

Ericsson, "Two Step Interleaving" 3GPP TSG RAN W1 AdHoc 4, Transport Channel Multiplexing, 11 pages Mar. 10, 1999.

* cited by examiner

| 0  | 1  | 2  | 3  | 4  | 5  | 6  | 7  |
|----|----|----|----|----|----|----|----|
| 8  | 9  | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
| 64 | 65 | 66 | 67 | 68 | 69 | 70 | 71 |
| 72 | 73 | 74 | 75 | 76 | 77 | 78 | 79 |
| 80 | 81 | 82 | 83 | 84 | 85 | 86 | 87 |

FIG. 5
(Prior Art)

| S,T | K | 1 | 2 | | 4 | | | | 8 | | | | | | | |
|---|---|---|---|---|---|---|---|---|---|---|---|---|---|---|---|---|
| | k | 0 | 0 | 1 | 0 | 1 | 2 | 3 | 0 | 1 | 2 | 3 | 4 | 5 | 6 | 7 |
| Q | 1 | 0;0 | 0;0 | 0;1 | 0;0 | 0;2 | 0;1 | 0;3 | 0;0 | 0;4 | 0;2 | 0;6 | 0;1 | 0;5 | 0;3 | 0;7 |
| | 2 | | 0;0 | 1;1 | 0;0 | 0;1 | 1;3 | 0;2 | 0;0 | 0;2 | 0;1 | 0;3 | 1;5 | 1;7 | 1;6 | 0;4 |
| | 3 | | | | 0;0 | 1;2 | 2;3 | 0;1 | 0;0 | 1;4 | 2;6 | 0;2 | 1;3 | 2;7 | 0;1 | 1;5 |
| | 4 | | | | 0;0 | 1;2 | 2;3 | 0;1 | 0;0 | 0;1 | 2;5 | 1;4 | 3;7 | 2;6 | 1;3 | 0;2 |
| | 5 | | | | | | | | 0;0 | 3;4 | 2;2 | 4;6 | 4;5 | 1;1 | 5;7 | 2;3 |
| | 6 | | | | | | | | 0;0 | 1;2 | 2;3 | 0;1 | 5;7 | 3;5 | 4;6 | 2;4 |
| | 7 | | | | | | | | 0;0 | 3;4 | 5;6 | 1;2 | 6;7 | 2;3 | 4;5 | 0;1 |
| | 8 | | | | | | | | 0;0 | 3;4 | 5;6 | 1;2 | 6;7 | 2;3 | 4;5 | 0;1 |

FIG. 6
(Prior Art)

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
| 64 | 65 | 66 | 67 | 68 | 69 | 70 | 71 |
| 72 | 73 | 74 | 75 | 76 | 77 | 78 | 79 |
| 80 | 81 | 82 | 83 | 84 | 85 | 86 | 87 |
| 88 | 89 | 90 | 91 | 92 | 93 | 94 | 95 |
| 96 | 97 | 98 | 99 | 100 | 101 | 102 | 103 |
| 104 | 105 | 106 | 107 | 108 | 109 | 110 | 111 |
| 112 | 113 | 114 | 115 | 116 | 117 | 118 | 119 |
| 120 | 121 | 122 | 123 | 124 | 125 | 126 | 127 |
| 128 | 129 | 130 | 131 | 132 | 133 | 134 | 135 |
| 136 | 137 | 138 | 139 | 140 | 141 | 142 | 143 |
| 144 | 145 | 146 | 147 | 148 | 149 | 150 | 151 |
| 152 | 153 | 154 | 155 | 156 | 157 | 158 | 159 |

FIG. 7
(Prior Art)

| 0 | 1 | *2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
| 64 | 65 | 66 | 67 | 68 | 69 | 70 | 71 |
| 72 | 73 | 74 | 75 | 76 | 77 | 78 | 79 |
| 80 | 81 | 82 | 83 | 84 | 85 | 86 | 87 |
| 88 | 89 | 90 | 91 | 92 | 93 | 94 | 95 |
| 96 | 97 | 98 | 99 | 100 | 101 | 102 | 103 |
| 104 | 105 | 106 | 107 | 108 | 109 | 110 | 111 |
| 112 | 113 | 114 | 115 | 116 | 117 | 118 | 119 |
| 120 | 121 | 122 | 123 | 124 | 125 | 126 | 127 |

FIG. 8
(Prior Art)

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

METHOD AND APPARATUS FOR TRANSMITTING DATA FRAMES, AND A METHOD AND APPARATUS FOR DATA RATE MATCHING

This application is a continuation of, claims priority to and claims the benefit of U.S. patent application Ser. No. 10/110,183 filed on Apr. 8, 2002, the entire contents of which are incorporated herein.

BACKGROUND

The present invention relates to a method and an apparatus for transmitting data frames, as well as to a method and an apparatus for data rate matching; in particular, by using a repetition of bits to be transmitted.

Digital communications systems are designed for transmitting data by representing the data in a form that facilitates the transmission of the data via a communication medium. For example, in the case of radio transmissions, the data are transmitted, represented as radio signals, between transmitters and receivers of the communications system. In the case of broadband telecommunications networks, the data can be represented as light transmitted, for example, via a fiber optic network between transmitters and receivers in the system.

During the transmission of data, bits or symbols of the transmitted data can be corrupted, with the effect that these bits or symbols cannot be correctly determined in the receiver. For this reason, the data communications systems frequently have ways to moderate the corruption of the data that occurs during the transmission. One of these ways consists in equipping transmitters in the system with coders that code the data before transmission in accordance with an error control code. The error control code is designed such that it adds redundancy to the data in a controlled fashion. In the receiver, errors that occur during transmission can be corrected by decoding the error control code. As a result, the original data are reproduced. The decoding is effected by using an error decoding algorithm that corresponds to the error control code which is known to the receiver.

After the data have been coded, it is frequently necessary for the purpose of data rate matching to puncture or to repeat data bits or symbols from a block of coded data before these data are transmitted. The term puncturing/repetition is intended here to signify a process of removing or deleting bits from a coded data block with the effect that the punctured bits are not transmitted with this data block, or to signify a process of repeating bits from a coded data block with the effect that the bits to be repeated are transmitted several times with this data block. Even if only one term "puncturing" or "repetition" is commonly used below, it goes without saying that the present invention also can be used for the other case of "repetition" or "puncturing."

The puncturing could be required, for example, because a multiple access method that serves for transmitting the data via the data-carrying media requires formatting of the data to form blocks of predetermined size, which size does not correspond to the size of the coded data frame.

In order to accommodate the coded data frame in the transport data block of the predetermined size, data bits are therefore either punctured from the coded data frame in order to reduce the size of the coded data block, in a case in which the coded data frame is larger than the size of the transport block, or bits in the coded data frame are repeated, in a case in which the coded data frame is smaller than the predetermined size of the transport block. In a case in which the data frame is smaller than the transport data block, the data bits (bits) or data symbols are repeated to the extent necessary to fill the rest of the transport data block.

Those skilled in the art are familiar with the fact that one effect of puncturing a coded data frame is that the probability of correct reproduction of the original data is reduced. Moreover, the performance of known error control codes and of decoders for these error control codes is best when the errors that occur during the transmission of the data are caused by Gaussian noise, since this has the effect that the errors are distributed independently over the transport data block. When a coded data frame is intended to be punctured, the positions in the coded data frame at which bits are punctured are to be separated as far as possible from one another. To this extent, the puncturing positions should be distributed uniformly over the data frame. Since errors during transmission frequently occur in bursts, particularly in the case of radio communications systems that do not use interleaving, and since the repetitions of bits are not intended to particularly raise the quality only in a certain region of the data frame but as uniformly as possible, bit positions in a coded or uncoded data frame at which data bits are intended to be repeated should also be arranged such that they are uniformly separated from one another in the entire data frame.

Known methods for selecting the positions of bits or symbols that are intended to be punctured or repeated in a coded data frame include the division of the number of bits or symbols in a frame by the number of bits or symbols that are intended to be punctured or repeated, and the selection of the bit positions with integral values corresponding to the division. However, in a case in which the number of bits to be punctured is not an integral division of the number of bits in the data frame, this does not lead to a uniform spacing of the punctured or repeated bit positions, thus resulting in the disadvantage that specific bit positions are situated closer to one another than this whole number or are situated further (in part, substantially further) removed from one another than this whole number, and in some cases even alongside one another.

The interleaving in a transport multiplexing method is frequently carried out in two steps. The various solutions for carrying out the puncturing/repetition have specific consequences when the puncturing is carried out downstream of the first interleaver as is provided for the UMTS system. It is necessary here to take particular notice of the fact that the performance could deteriorate when a block interleaver with a column exchange, such as the FS-MIL (FS Multistage Interleaver) used in UMTS, is used as interleaver in the up-link multiplexing method in conjunction with a rate matching algorithm. Downstream of the first interleaver, the bits assigned to a frame are further interleaved by a second interleaver that is described, for example, in TS 25.212 (see below for more accurate details), Chapter "4.2.11 2nd interleaving." This second interleaver has no influence, however, on aspects of the puncturing/repetition and is therefore not taken further into account below; it is of no importance with regard to the present invention. Consequently, the above-named first interleaver is frequently also simply named interleaver in this document.

A block interleaver with column exchange functions as follows. First, the bits are written rowwise into a matrix. This matrix includes F columns, F being the number of frames (also frequently termed radio frames or columns below) over which the data of a data frame are distributed; see also TS 25.212 (see below for more accurate details) Chapter "4.2.5 1st interleaving."

In the current version of the UMTS standard (3GPP TSG RAN WG1; Multiplexing and channel coding (FDD); TS 25.212 V2.3.0 (1999-10)) Chapter "4.2.7 Rate matching," in particular section "4.2.7.1.2 Determination of parameters needed for calculating the rate matching pattern," a method is represented that was presented in the article R1-99641 (Siemens; Properties of optimised puncturing scheme; TSG-RAN WG1#5, June 1-4, Cheju, Korea). This method distributes punctured bits as uniformly as possible and, in particular, avoids the case of the puncturing of bits situated close to one another. This is also achieved for the case of the application of puncturing using the (interframe) interleaver. The same method also can be applied for the case of repetition, which likewise leads to good results.

In the article R1-99641 mentioned, the following modifications were proposed to the rate matching method The rate matching was carried out using the puncturing/repetition pattern by applying a common pattern to all frames, the pattern being displaced in the case of the individual frames. Use was made for calculating the displacement of simple calculating rules that take account of the effect of the column exchange by the interleaver (for example, an FS-MIL)) (the term column exchange, sometimes also termed column randomizing, is used here instead of "row-by-row processing").

Owing to the fact that the operation of column exchange is taken into account in the formulas, the same effect is achieved as if the rate matching were carried out upstream of the column exchange of the interleaver, although for practical reasons it must be carried out downstream thereof. This is achieved by virtue of the fact that account is taken of the column exchange rule, more precisely its inversion RF (and $R_F$, respectively, or RF(k) and $R_F(k)$, respectively) in the formulas for calculating S (the displacement of the pattern per column or frame) or $e_{offset}$ (a parameter that is used in the rate matching algorithm, presented further below, that is carried out per frame). Similar procedures can be used for puncturing and repetition, the present invention particularly dealing with the case of repetition. The carrying out, necessary owing to other prescriptions, of the rate matching downstream of the first interleaver has consequences, in this case, for the optimum generation of puncturing and repetition patterns.

The aim of a good repetition method is to distribute the repeated bits as uniformly as possible. The same also holds for a good puncturing method. The method presented in the abovementioned article R1-99641 operates as represented below (for the sake of simplicity, puncturing/repetition will not always be written below, but only one alternative; it is obvious that the argument also can be applied for the other alternative). The most uniform distribution can be achieved when each nth bit is repeated. However, if the repetition rate or n is not integral, the spacing must be varied; that is, sometimes the nth and sometimes the n+1th bit must be repeated. An attempt also can be made to apply this principle when the repetition is applied downstream of the first interleaver, although there is a further secondary condition in this case: the repeated bits must be distributed uniformly over all radio frames.

Figure 4:
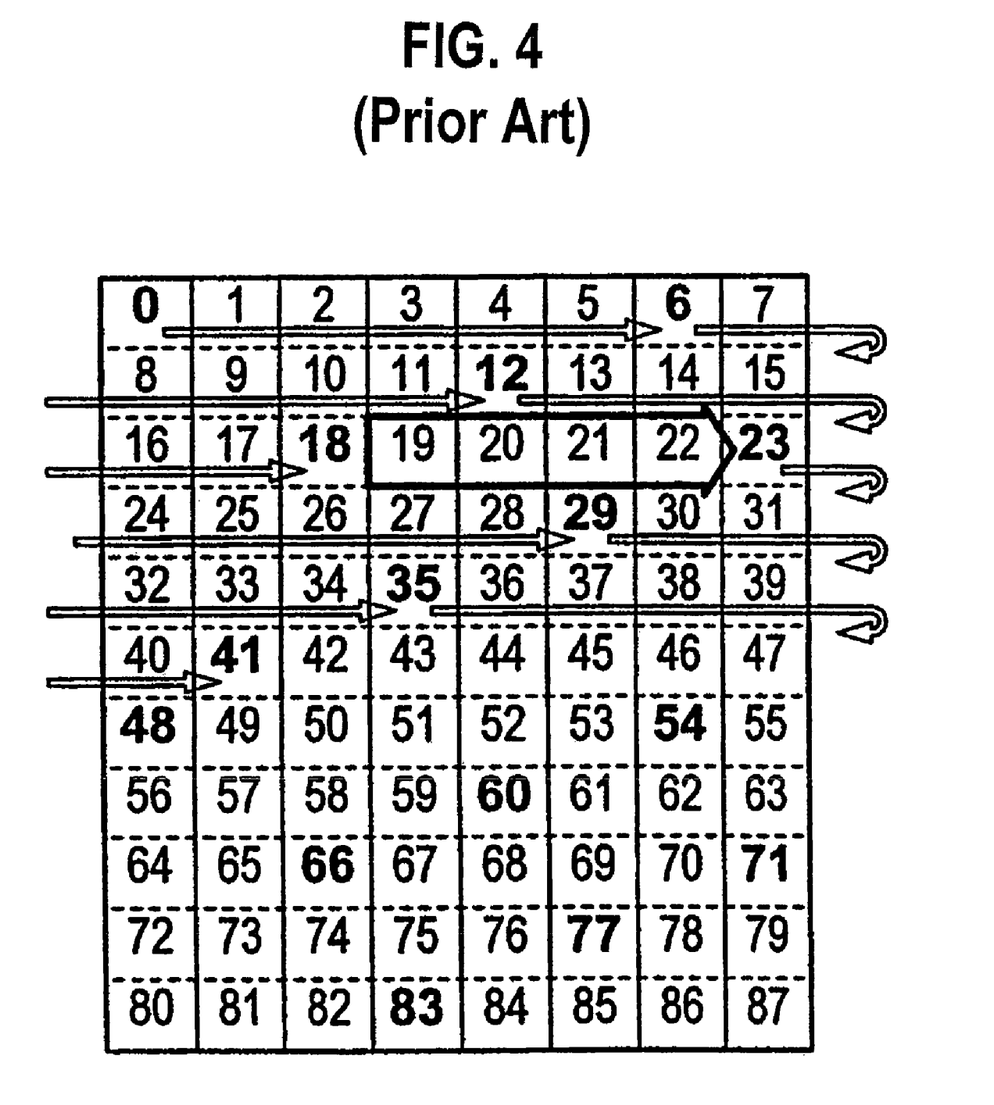
FIG. 4 shows an exemplary embodiment of the principle of an optimized puncturing scheme (prior art).

As an example, an interleaving interval of 80 ms and a repetition rate of 1:6 will be assumed in FIG. 4. The numbers printed in bold mark the bits to be repeated. If each 6th bit were repeated, only bits in the columns 0,2,4,6 but not in the columns 1,3,5,7 would be repeated, which leads to a nonuniform distribution of the repeated bits over the radio frames. In order to distribute the repetitions uniformly over all columns, the repetition interval is sometimes modified (in this case, once) in order to prevent always the same columns from being punctured. This is shown in FIG. 4.

The narrow horizontal arrows with thin outlines show a repetition spacing of 6, and the wide horizontal arrow with a thick outline shows a repetition spacing, differing therefrom, of 5, in order to avoid repeating the first column too early a second time. After each column has been repeated once, the repetition pattern can be displaced downward by 6 rows, in order to determine the next bits (beginning at 48) to be repeated, and so on. Clearly, this procedure is equivalent to puncturing each 6th bit in a column and displacing this puncturing pattern in different columns relative to one another.

The formulas or the calculating method are specified below, with the aid of the example of puncturing, for the optimized method that is defined in the abovementioned article R1-99641 and is best suited to the case of puncturing.

The number of bits per radio frame before the rate matching can be denoted by $N_c$, the number of the bits per radio frame after the rate matching by $N_i$, the index or the position of a bit to be punctured/repeated in the first column (k=0) by $m_j$, the frame number by k, and the number of frames over which the interleaving is carried out by F. It is essentially the case of $N_c > N_i$, that is to say puncturing, that is considered. However, the formulas also can be applied for the case of repetition. Let the following first set of parameters hold in the example: $N_c=20$, $N_i=16$, $m_1=4$, $m_2=9$, $m_3=14$, $m_4=19$, k=0, . . . 7, and F=8. The displacement of the puncturing pattern then can be determined with the aid of the following formulas. Here and in the context of the overall application, a commentary on the corresponding steps is given after the double dash "--"

--calculation of the mean puncturing spacing.

--- q: = ($\lfloor N_c/(N_i-N_c) \rfloor$) mod F -- here, $\lfloor\ \rfloor$
signifies rounding down and // the absolute value.
   Q: = ($\lfloor N_c/(N_i-N_c) \rfloor$) div F
   if q is even - treat special case.
   then q = q − lcd(q, F)/F
   -- Here, lcd (q, F) denotes the greatest common divisor of q and F.
   -- The greatest common divisor can be calculated easily by bit manipulations when F is a power of two.
   -- For the same reason, calculations with p can be carried out easily by binary fixed-point operations (or, alternatively, by integer arithmetic with the use of displacement operations.
   endif
   -- calculation of S and T; S represents the displacement of the row mod F and T the absolute displacement value div F;
   S therefore represents the displacement of the row with respect to q (that is to say mod F), and T the absolute displacement value with respect to Q (that is to say, div F).
   for i = 0 to F−1
     S(RF ($\lceil i*q \rceil$ mod F)) = ($\lceil i*q \rceil$ div F) -- $\lceil\ \rceil$ signifying rounding up.
     T((RF($\lceil i*q \rceil$ mod F)) = i -- RF(k) inverts the interleaver,
   end for

---

Figure 5:
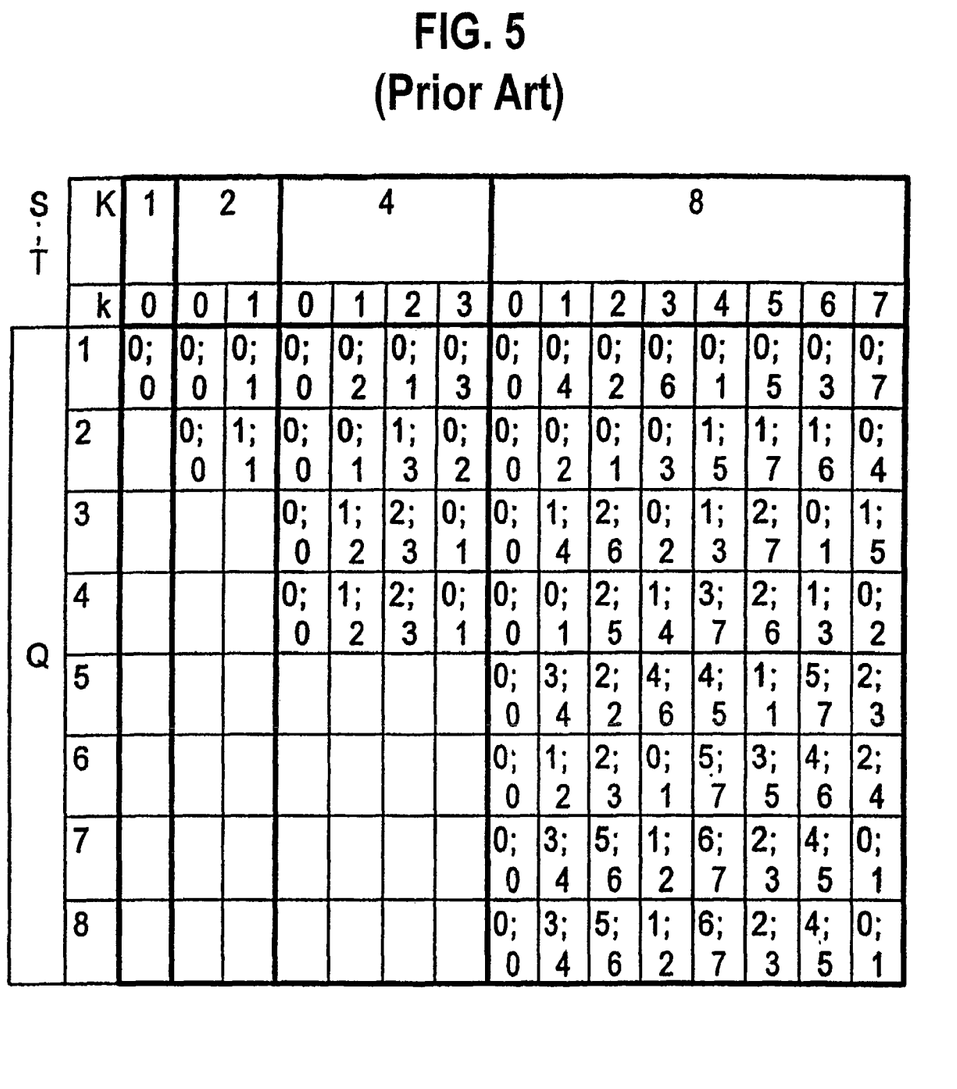
FIG. 5 shows a lookup table (prior art).

In a real implementation, these formulas can be implemented as a reference table, as shown in FIG. 5. The table also includes the effect of the column exchange taken into account by RF(k). S can be calculated from T as a further implementation option.

It is then possible to calculate $e_{offset}$ as follows:

$$eoffset(k) = ((2*S) + 2*T*Q + 1)*y + 1) \bmod 2Nc$$

With the aid of eoffset (k), e is then preloaded in the rate matching method for UMTS. This choice of eoffset obviously effects a displacement of the puncturing patterns of the columns relative to one another or relative to the column denoted by k=0 by the amount S+T*Q.

$e_{offset}$ is sometimes also termed $e_{init}$. The rate matching method for UTMTS, which is applied inside a single frame, is described in TS25.212 (see above for more accurate details), section 4.2.7.4 "Rate matching pattern determination." It describes a puncturing or repetition method based on an error control. This method is described here once more.

Before the rate matching, the bits may be denoted as follows:

$x_{i,1}$, $x_{i,2}$, $x_{i,3}$, $x_{i,4}$, ... $x_{i,N}$, in which case i denotes the number of the transport channel (TrCH number) and N is the parameter that is defined in chapter 4.2.7.2 of TS 25.212.

The rate matching algorithm then operates as follows:

```
if puncturing is to be carried out,
    e = e_ini  -- initial error between the current and desired puncturing rate.
    m = 1  -- Index for the currently treated bit.
    do while m <= N
        e = e - e_minus         -- match error value.
        if e <= 0 then  -- query as to whether bit number m is to be punctured.
            Puncture bit x_{i,m}
            e = e + e_plus      -- match error value.
        end if
        m = m + 1               -- next bit.
    end do
else
    e = e_ini                   -- Initial error between the current and
desired puncturing rate.
    m = 1                                   -- Index for the currently
treated bit.
    do while m <= N
        e = e - e_minus         -- Match error value.
        do while e <= 0         -- query as to whether bit number
m is to be repeated.
            repeat bit x_{i,m}
            e = e + e_plus      -- match error value.
        end do
        m = m + 1               -- next bit.
    end do
end if
```

If a bit is repeated, it is inserted immediately after the bit originally already present.

Described below is a simplified representation which simply results from the fact that the calculation of q and Q is not carried out separately for the remainder in the case of the division by F and the multiple of F, but in a combined fashion for both components. In the same way, S and T cannot be calculated separately for q and Q, but are likewise calculated in a combined fashion. The substitution q+F*Q→q and S+Q*TS yields the following equivalent representation. Depending on the details of the implementation, one or other calculation method (or further methods likewise equivalent thereto) can be carried out more favorably.

--Calculation of the mean puncturing distance

```
q: = (⌊Nc/(|Ni-Nc|)⌋) -- ⌊ ⌋ signifying rounding down and ||
signifying absolute value.
    if q is even -- treat special case.
    then q = q - lcd(q, F)/F -- lcd (q, F) signifying the greatest
common divisor of q and F.
    -- note that lcd can be calculated easily by bit manipulations,
because F is a power of two.
    -- For the same reason, calculations with q can be carried out
easily with the aid of binary fixed-point arithmetic (or integer arithmetic
and a few shift operations).
    endif
    -- Calculation of S(k) of the displacement of column k.
    for i = 0   to F-1
        S(RF(⌈i*q⌉ mod F)) = (⌈i*q⌉ div F) -- ⌈ ⌉ signifying rounding
up.
    -- RF(k) inverts the interleaver.
    end for
```

It is then possible to calculate $e_{offset}$ in the following way:

$$e_{offset}(k) = ((2*S)*y+1) \bmod 2Nc$$

With the aid of $e_{offset}$ (k), e is then initialized in advance in the rate matching method.

Those skilled in the art know that the constant 1 used in this definition of $e_{offset}$ also can be replaced by any other value desired if it is identical for all columns or frames. For reasons of simplified representation, this will not be examined explicitly below. Furthermore, the methods presented can be further modified or expanded, although the basic assumptions are retained.

If the puncturing rate is an odd-numbered fraction (that is to say with an odd denominator), such as 1:5 or 1:9, this known method produces the same perfect puncturing pattern that would be applied directly before interleaving by puncturing with the use of the rate matching method. In other cases, adjacent bits are never punctured; however, a distance between punctured bits can be greater than the others by up to lcd(q,F)+1. This method also can be applied correspondingly to bit repetitions. Although the repetition of adjacent bits does not impair the performance of the error correction code so strongly as is the case when puncturing adjacent bits, it is nevertheless advantageous to distribute repeated bits as uniformly as possible.

The fundamental objective of this known method is to achieve a uniform spacing between the punctured bits in the original sequence, while taking account, however, of the constraint that the same number of bits are to be punctured in the various frames. This is achieved by virtue of the fact that the puncturing distance is reduced by 1 in specific cases. The method presented is optimum to the extent that it never reduces the distance by more than 1 and reduces it only as often as necessary. This yields the best possible puncturing pattern subject to the constraints mentioned above.

Figure 6:
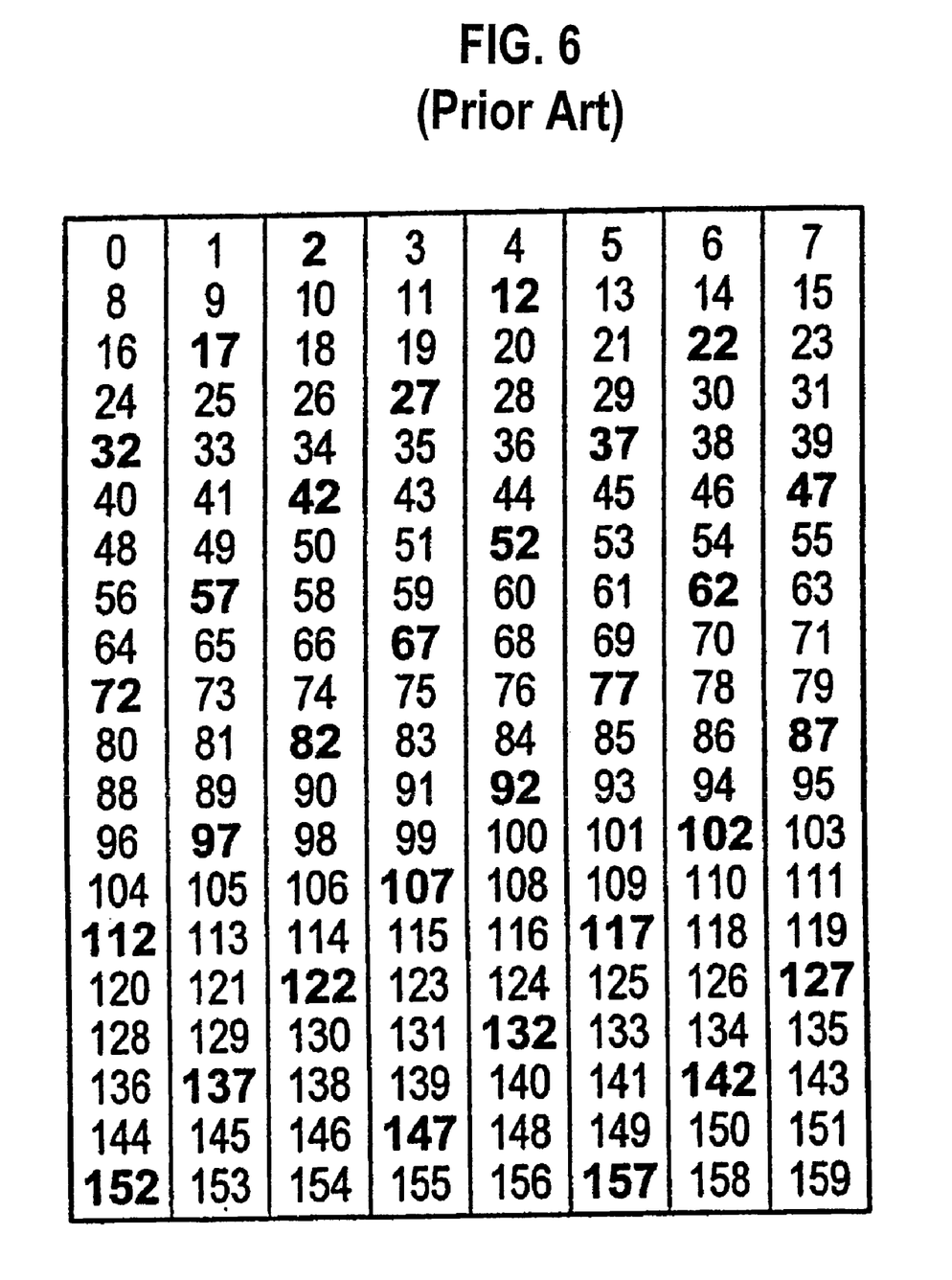
FIG. 6 shows 1st interleaving of 80 ms and 1:5 puncturing (prior art).

The following example shows the use of the first set of parameters ($N_c$=20, $N_i$=16, $m_1$=4, $m_2$=9, $m_3$=14, $m_4$=19, k=0, ... 7, and F=8), that is to say puncturing with 1:5 (FIG. 6). The optimized method obviously not only avoids the puncturing of adjacent bits, but moreover distributes punctured bits with the same spacing in the original sequence. In fact, the same characteristics are achieved as if the puncturing had been carried out directly after the coding and before the interleaving.

Figure 7:
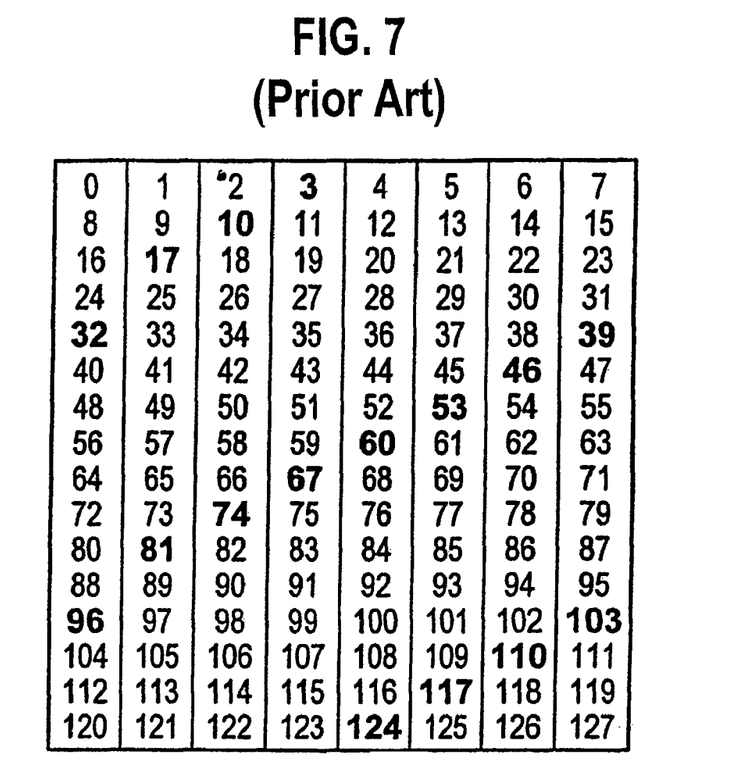
FIG. 7 shows 1:8 puncturing with methods from R1-99641 (prior art)

The aim now is to investigate the next case, that is to say puncturing with 1:8 (FIG. 7). Once again, the puncturing of adjacent bits is avoided. In this case, it is impossible to achieve uniformly spaced puncturing, because all the bits in an individual frame would be punctured, which is completely unacceptable. In this case, most of the distances between adjacent bits are 7 (only 1 less than in the case of an optimum distribution). In return, some distances are greater (every eighth).

However, it has emerged that the previously proposed solutions, that is to say the proposed puncturing pattern in the case of application as a repetition pattern, still is not always optimal in all cases. Starting therefrom, it is an object of the present invention to reduce the disadvantages of the prior art. In particular, it is an object of the present invention to specify a technical teaching that permits decoding of good quality in the receiver; particularly, in the case of the repetition of bits.

SUMMARY

Consequently, the present invention is based on the finding that the decoding result in the receiver depends on the repetition patterns in the transmitter, and the criteria for a good puncturing pattern and a good repetition pattern differ from one another. An improvement in performance by comparison with the patterns presented in R1-99641 can be achieved for the case of repetition by taking particular account of the criteria that are relevant for a good repetition pattern when determining the repetition pattern.

Accordingly, in an embodiment of the present invention, a method is provided for data rate matching, which includes: distributing data to be transmitted as bits over a set of frames via a first interleaver; carrying out a repetition method, for purposes of the data rate matching, after interleaving such that a same number of bits are repeated in each frame, and the repeated bits have as uniform as possible a spacing from one another with regard to a sequence of the bits upstream of the first interleaver; and applying, in displaced fashion, the repetition pattern which is supplied inside a frame, also inside further frames of the set of frames.

In a further embodiment of the present invention, a method is provided for transmitting data frames, which includes: distributing elements, that are transmitted, over a set of frames via an interleaver; and carrying out a repetition method for purposes of data rate matching after the interleaving such that the repetition pattern prevents spacing between two arbitrary consecutive repeated elements from being substantially greater than a mean repetition spacing, the spacing being regarded in relation to a sequence of the elements upstream of the interleaver.

In further embodiments of the present invention, apparatuses are provided for carrying the methods as described above.

Additional features and advantages of the present invention are described in, and will be apparent from, the following Detailed Description of the Invention and the Figures.

Additional features and advantages are described herein, and will be apparent from, the following Detailed Description and the figures.

DETAILED DESCRIPTION

An exemplary embodiment of the present invention is described with reference to a mobile radio communications system. Mobile radio communications systems are equipped with multiple access systems that operate, for example, in accordance with multiple access in time division multiplexing (TDMA), such as, that used in the Global System for Mobile communications (GSM), a mobile radio communications standard standardized by the European Telecommunications Standard Institution. As an alternative, the mobile radio communications system could be equipped with a multiple access system that operates in accordance with multiple access in code division multiplexing (CDMA), such as the UMTS system proposed for the universal third-generation mobile telecommunications system. However, it is clear that to illustrate an exemplary embodiment of the present invention, use could be made of any desired data communications system, such as a local data network or a broadband telecommunications network that operates in accordance with the asynchronous transmission mode. These exemplary data communications systems are characterized, in particular, in that data are transmitted as frames, packets or blocks. In the case of a mobile radio communications system, the data are transported in frames of data-carrying radio signals that constitute a predetermined data size. An example of such a mobile radio communications system is shown in FIG. 2.

Figure 2:
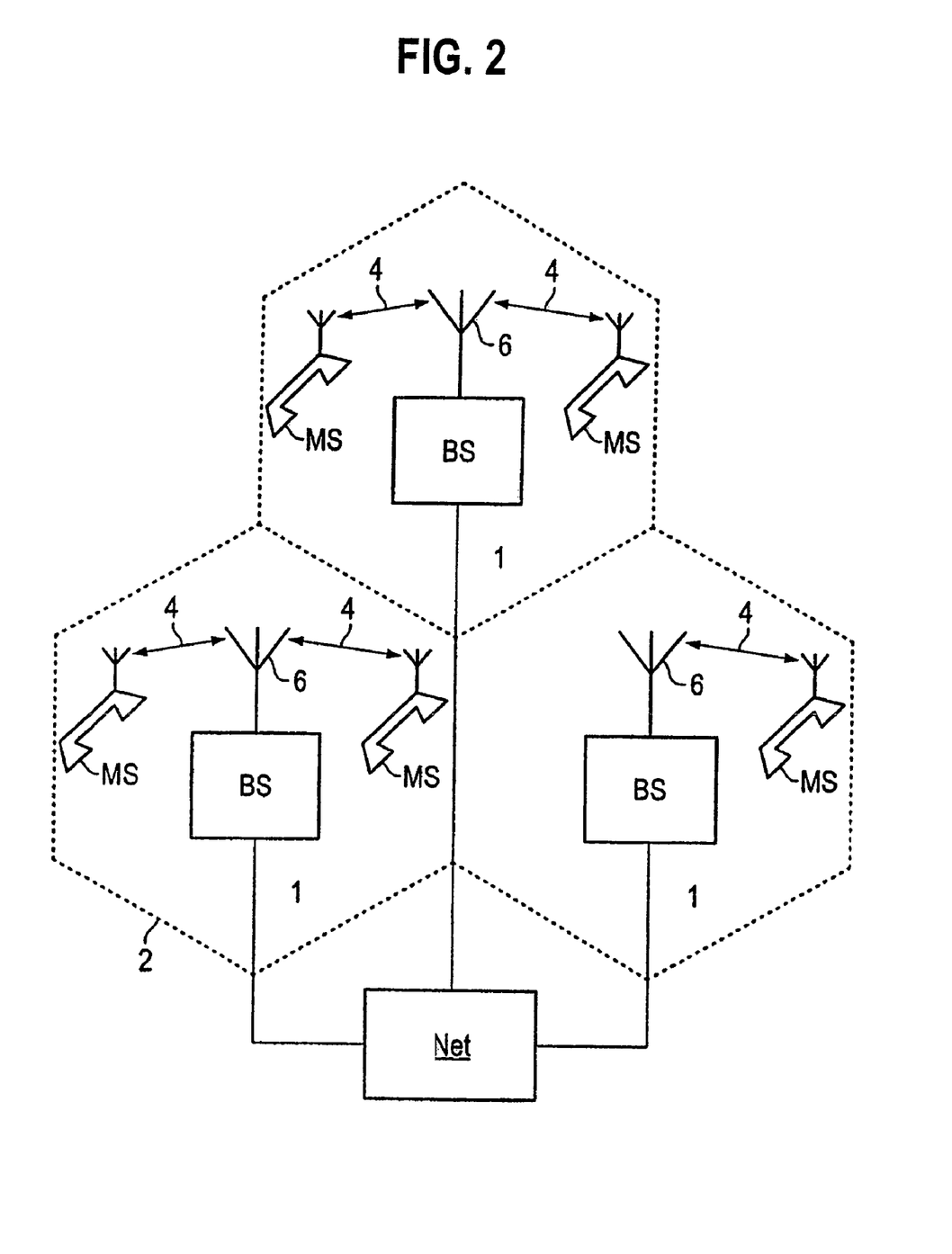
FIG. 2 shows a block diagram of a mobile radio communications system.

Shown in FIG. 2 are three base stations BS that exchange radio signals with mobile stations MS in a radio coverage area that is formed by cells 1 that are defined by dashed lines 2. The base stations BS are coupled together with the aid of a network relay system NET. The mobile stations MS and the base stations BS exchange data by transmitting radio signals, denoted by 4, between antennas 6 that are coupled to the mobile stations MS and to the base stations BS. The data are transmitted between the mobile stations MS and the base stations BS by using a data communications apparatus in which the data are transformed into radio signals 4 that are transmitted to the receiving antenna 6, which identifies the radio signals. The data are reproduced from the radio signals by the receiver.

Figure 3:
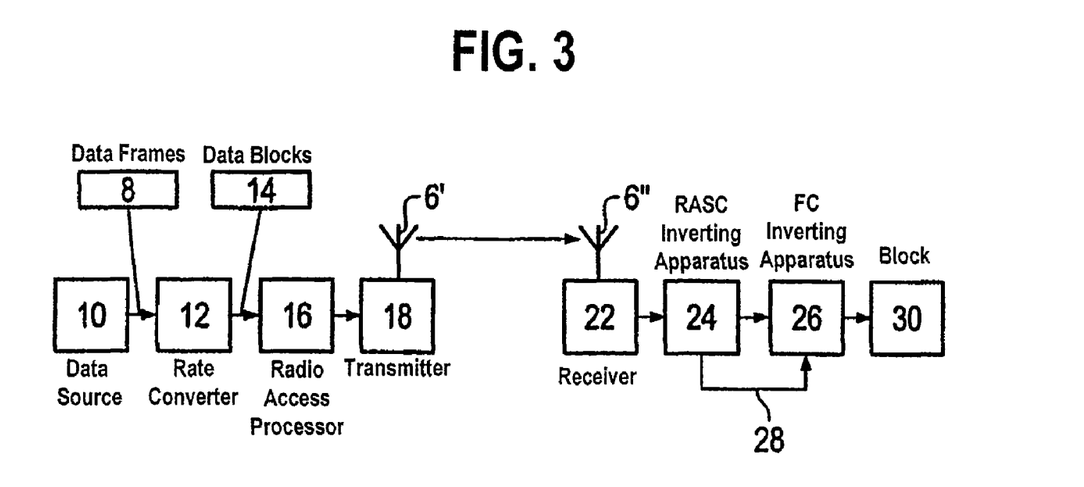
FIG. 3 shows a block diagram of a data communication apparatus that forms a link between the mobile station and a base station of the communications network shown in FIG. 2.

FIG. 3 shows an example of a data communications apparatus that forms a radio communication link between one of the mobile stations MS and one of the base stations BS, elements that also appear in FIG. 2 bearing identical numerical designations.

In FIG. 3, a data source 10 produces data frames 8 at a rate that is determined by a data type produced by the source. The data frames 8 produced by the source 10 are fed to a rate converter 12 that acts to convert the data frames 8 to transport data blocks 14. The transport data blocks 14 are designed such that they are substantially the same size, with a predetermined size and an amount of data that can be carried by frames of data-carrying radio signals, via which data are transmitted by a radio interface that is formed by a pair including a transmitter 18 and receiver 22.

The data transport block 14 is fed to a radio access processor 16 that acts to control the sequence of the transmission of the transport data block 14 via the radio access interface. At an appropriate time, the transport data block 14 is fed by the radio access processor 16 to a transmitter 18 that acts to convert the transport data block to the frame of data-carrying radio signals, which are transmitted in a time interval that is allocated to the transmitter in order to effect the transmission of the radio signals. In the receiver 22, a receiver antenna 6" identifies the radio signals and carries out downward conversion and reproduction of the data frame, which is fed to a radio access sequence control inverting apparatus 24. The radio access sequence control inverting apparatus 24 feeds the received data transport block to a frame conversion inverting apparatus 26 under the control of the multiple access sequence control inverting apparatus 24, which is effected via a conductor 28. The rate conversion inverting apparatus 26 thereafter feeds a representation of the reproduced data frame 8 to a destination or sink for the data frame 8, which is represented by the block 30.

The rate converter 12 and the rate conversion inverting apparatus 26 are designed such that, as far as possible, they optimally utilize the data-carrying capacity available in the transport data block 14. This is effected in accordance with the exemplary embodiment of the present invention via the rate matching converter 12, which acts to code the data frame and subsequently puncture or repeat data bits or symbols that are selected from the coded data frame, with the effect of producing a transport data block that fits into the data blocks 14. The rate converter 12 has a coder and a puncturer. The data frame 8 fed to the coder is coded in order to produce a coded data frame that is fed to the puncturer. The coded data frame is then punctured by the puncturer in order to produce the data transport block 14.

Puncturing or repetition is achieved by virtue of the fact that a common puncturing pattern or repetition pattern is applied in the various frames in a fashion displaced relative to one another. Although the puncturing/repetition is applied downstream of the (interradio frame) interleaver, the same effect, that is to say the same puncturing/repetition pattern, is achieved as if the puncturing/repetition were applied before the column exchange.

Surprisingly, however, the above-described method can be further improved for the case of repetition. This is possible because certain differences exist between good repetition patterns and puncturing patterns: in the case of puncturing, it is particularly damaging to puncture consecutive bits. Moreover, it should be avoided that the spacing between consecutive punctured bits is significantly smaller than the average puncturing spacing. The reason for this is that puncturing carried out more intensively or in a shorter spacing locally increases the bit error rate disproportionately, which then impairs the overall performance.

The changes that are undertaken in order to improve the known method are explained below, with the explanation at the beginning being for the case of repetition. The method described at the beginning is obviously optimum for achieving a uniform distribution of punctured bits.

The repetition of consecutive bits does not lead to a substantial worsening of the decoding results. Expressed more generally, the performance also is not substantially impaired when the spacing between consecutive repetitions is distinctly smaller than the mean repetition spacing. However, when the spacing is locally distinctly higher, the improved decoding option otherwise rendered possible by repetition also is not present in this region. This would, in turn, signify a locally increased bit error rate as in the case of the above-mentioned unfavorable puncturing. It is, therefore, advantageous to use a slightly increased repetition spacing more often than a significantly increased spacing correspondingly more seldom. In order to fulfil this optimization criterion, the method set forth above shall be modified as follows for determining the displacement of the repetition pattern in the individual columns.

When the average puncturing spacing q is being calculated, rounding down to the next smaller whole number is not carried out, but rounding up to the next greater whole number (if q is not already itself integral) is.

When q is even, q is not reduced, but increased.

The formula set forth above in the simplified form or the simplified calculating method set forth above then appears as follows with these changes (corresponding changes also can, of course, be carried out in the case of the first-presented form of the formula, or in the case of any desired other representations, in order to achieve the desired matching for repetition):

q: = ($\lceil N_c/(|N_i-N_c|) \rceil$)-- here, $\lceil \ \rceil$ signifies rounding up, and $\| \ \|$ the absolute value.
-- avoid hitting the same column too early a second time.
if q is even
then q = q + lcd(q, F)/F
-- here, lcd (q, F) signifies the greatest common divisor of q and F
-- the greatest common divisor can easily be calculated by bit manipulations when F is a power of two.
-- For the same reason, calculations with p can easily be carried out by binary fixed-point operations. (or, alternatively, by integer arithmetic with the use of displacement operations.
endif
-- calculate S; S signifies the displacement of the pattern per column.
for i = 0 to F-1
S(RF ($\lfloor i*q \rfloor$mod F)) = ($\lfloor i*q \rfloor$div F) -- here, $\lfloor \ \rfloor$ signifies rounding down.
-- $R_F$(k) (corresponds to RF(k)) is the inversion of the first interleaver, more precisely the inversion of the column exchange operation of the first interleaver.
This function is itself inverse for the case of the UMTS system being developed.
end for The parameter $e_{offset}$ can then be calculated as follows:

$$e_{offset}(k)=((2*S(k)*|N_i-N_c|+1) \bmod 2Nc$$

The puncturing/repetition patterns of the individual columns k are displaced relative to one another by the amount S(k). If use is made for the calculation of the bits to be punctured/repeated of what is termed an error distribution algorithm, this displacement can be achieved by preloading the initial error value, as shown above. Of course, other implementations are also possible for achieving the displacement, particularly in the case of using another puncturing method inside a column.

There is a further difference between puncturing and repetition. Even in theory, the puncturing rate can in no case exceed 100% (that is where every bit is punctured). In practice, the decoding performance in the case of puncturing rates that are higher than approximately 20% (in special cases, perhaps 50%) is so strongly impaired that such high puncturing rates are avoided. However, no such constraints exist for the repetition rate. A repetition rate of 100% (that is to say, each bit is transmitted twice) is perfectly possible, and even higher repetition rates are possible. Each bit can be repeated several times. The more repetitions that are sent, the higher is the probability of a correct decoding.

A repetition rate of 80% (that is to say, 80% of the bits are transmitted twice and 20% are only transmitted once, or not repeated) also can be interpreted such that although each bit is repeated (that is to say, transmitted twice), 20% of the bits (more precisely 20% of the original bits before the doubling) are punctured. Thus, 20% of the bits are transmitted with less energy by comparison with the rest, and thus with a lower reliability. This is very similar to the case in which 20% of the bits are punctured.

In both cases, 20% of the bits are transmitted with a lower reliability by comparison with the rest. However, the difference in the reliability in the case of puncturing (no information at all is available via the punctured bit) is greater than in the case of exclusion from the repetition, where the quality of the information via the relevant bit is, after all, still half as good as for the other bits.

Because of this equivalence of 20% puncturing and 80% repetition, a puncturing pattern that is optimum for a puncturing of 20% is also the optimum for a repetition of 80% if the following substitution is undertaken:

| 20% puncturing | 80% repetition |
|---|---|
| Punctured bit | Unrepeated bit |
| Unpunctured bit | Repeated bit |

For the case in which the puncturing is carried out upstream of the first interleaver, a puncturing method or repetition method, such as was described above and is also provided for UMTS in TS25.212 (see above for more details), will also generate equivalent patterns in the two above-named cases. However, the patterns will be displaced relative to one another by a constant amount. Yet, if the puncturing is not carried out until downstream of the first interleaver (interframe interleaver), this requires modification of the method. This modification is described for the case of puncturing in the above-named article R1-99641 (optimized displacement of the puncturing patterns), and described above for the case of repetition (optimized displacement of the patterns for repetition).

The puncturing or repetition rate can be represented as $r=(N_i-N_c)/N_c$ $N_c$ being the number of bits before the rate matching, and $N_i$ being the number of bits after the rate matching. We now define an "equivalent" rate for the case of repetition (that is to say, $N_i > N_c$) as:

$$re = ((N_i - N_c)/2) \bmod N_c - N_c/2)/N_c$$

As regards the optimum displacement of the patterns between the columns, a puncturing rate of 20% is therefore equivalent to a repetition rate of 80%, 180%, 280%, and so on. In exactly the same way, a repetition rate of 30% is equivalent to a repetition rate of 130%, 230%, 330%, and so on.

A further aspect of this variant design is the finding that the relative displacement of the puncturing patterns in the individual columns also can be calculated on the basis of this effective repetition rate re instead of the actual repetition rate. Depending on whether re is greater or less than 0 in this case, the formula for the calculation of the displacement for puncturing or the formula for the calculation of the displacement for repetition will be used for this purpose.

As a further exemplary embodiment, the variable q also can be calculated as the inverse of re:

$$q = N_c/((N_i - N_c/2) \bmod N_c - N_c/2).$$

There are several possibilities for calculating $N_c/2$ if $N_c$ is odd. It is possible to round up, round down or else calculate further with fractional values, that is to say dispense with rounding. According to this calculating method, the sign of q carries the information as to whether repetition or puncturing is carried out. Thus, it may be necessary to calculate the absolute value first before q is substituted in the appropriate formula.

As a further exemplary embodiment, the formula for calculating the displacements of the pattern also can be calculated as follows. This formulation has the additional advantage that there is no need to make any distinction between puncturing and repetition, both cases being covered by the same formula. It is within the bounds of expert activity to specify further formulas that define the displacement of the puncturing patterns while taking account of the principles represented above.

```
q: = ⌈N_c/((N_i-N_c/2) mod N_c - N_c/2) ⌉
  -- here, ⌈ ⌉ signifies rounding up to the next greater whole
number, for example ⌈1.5⌉ = 2 and ⌈-1.51⌉ = 1.
  if q is even - avoid hitting the same column too early a second
time.
    then q' = q + lcd (|q|, F)/F
    -- here, lcd signifies the greatest common divisor.
    -- The greatest common divisor can easily be calculated by bit
manipulations when F is a power of two.
    -- q' is not a whole number, but a multiple of 1/8, or more
generally a multiple of F.
    -- || signifies the absolute value
  else
    q' = q
  endif
  -- Calculate S(k), S signifies the displacement of the pattern per
column for the frame k. As shown above, for the purpose of calculating
the initial error value e, S(k) can be used in the above-cited rate matching
algorithm as it is described in the UMTS Specification TS25.212.
  for i = 0 to F-1
    S(R_F(⌊i*q'⌋/ mod F)) = (/⌊i*q'⌋/ div F)
    -- here, ⌊ ⌋ signifies rounding down.
  end for
```

An equivalent puncturing/repetition rate re is calculated in the above exemplary embodiment by modulo operations. Alternatively, modulo operations also can be used only to take account of multiples of 100% in the case of the rate, and the decision as to whether the rate is greater or less than 50% is implemented by an interrogation. At the same time, it is always possible to calculate q as a signed variable in order to preserve the advantage of the previous exemplary embodiment; that is to say, the uniform calculation of puncturing and repetition. In order to avoid divisions by 0, it may be necessary on occasions to treat separately the case in which no matching need be carried out. This results in the following equivalent formulas:

```
R = (N_i - N_c) mod N_c -- here, x mod N_c is in the range from 0 to
N_c-1, that is to say -1 mod 10 = 9.
  -- R is therefore the equivalent repetition rate (which lies in the
range of 0 to 50%) multiplied by N_c.
  if       R ≠ 0 and 2*R ≦ N_c
    -- If the equivalent repetition rate is less than 50%, repetition is
present, then q > 0.
    then q = ⌈N_c / R⌉
  else
    -- otherwise, puncturing is present, then q < 0.
    q = ⌈N_c / (R - N_c)⌉
  endif
  -- q is a signed variable here.
  if q is even
    then q' = q + lcd(|q|, F)/ F -- lcd (|q|, F) signifying the greatest
common divisor of |q| and F.
    -- q' is not a whole number but a multiple of 1/8 or of 1/F.
  else
    q' = q
  endif
  for k = 0 to F - 1
    S(RF ([|⌊k*q'⌋| modF])) = (|⌊k*q'⌋ | div F)
  end for
```

As already mentioned several times, the effect of the column exchange is taken into account inside the interleaver in the above-specified formulas. It may be mentioned for the sake of completeness that the principles described by these formulas also can be described by equivalent notations that lead to an equivalent result. An example for a changed notation may be represented briefly below:

$$N_c \rightarrow N_{i,j}$$

$$N_i - N_c \rightarrow \text{delta} N_{i,j}$$

$S(k) \to S(P1_{Fi}(n_i))=S(RF(x))$ $F \to F_i$.

Figure 1:
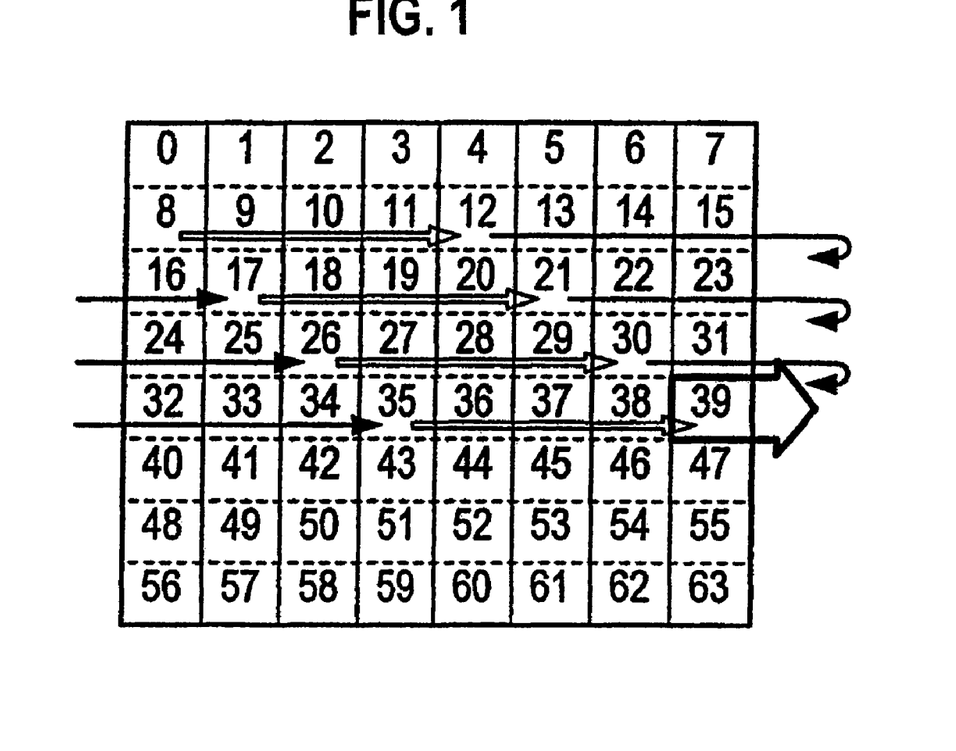
FIG. 1 shows 1:4 repetition pattern that results in the case of the application of an exemplary embodiment of the present invention.

FIG. 1 shows the resulting pattern for the proposed repetition pattern for a repetition rate of 1:4. Numbers printed in bold, or numbers at which arrows begin or end denote bits to be repeated. The arrows with thin outlines (for example, the arrow from 8 to 12) denote a spacing between adjacent repeated bits of 4, arrows drawn thinly (for example, the arrow from 12 to 17) denote the spacing 5, and the arrow with a thick outline (for example, the arrow from 39 to 40) denotes the spacing 1.

Figure 8:
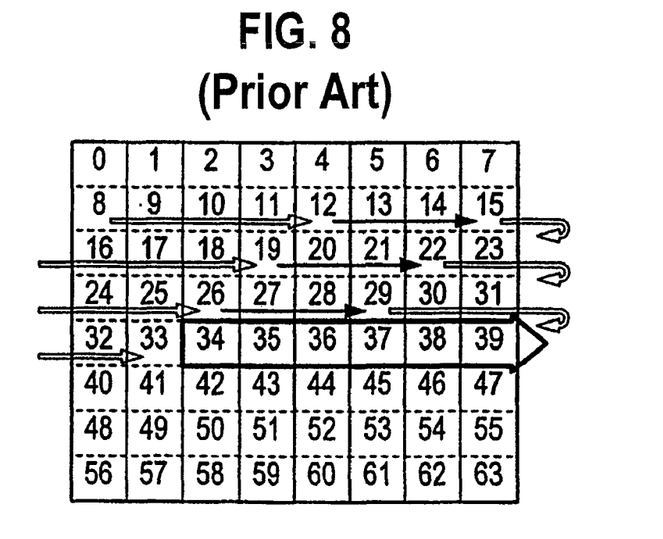
FIG. 8 shows 1:4 puncturing with methods from R1-99641 (prior art).

For the purpose of comparison, FIG. 8 shows the same case for the previously applied repetition method, as presented in R1-99641, for example. The arrows with thin outlines (for example, the arrow from 8 to 12) denote a spacing between adjacent repeated bits of 4, arrows drawn thinly (for example, the arrow from 12 to 15) denotes the spacing 3, and the arrow with a thick outline (for example, the arrow from 33 to 40) denotes the spacing 7.

Comparing the two illustrations shows that the repetition pattern within the scope of the present invention avoids a relatively large spacing between repeated bits (7 in FIG. 8). Since, in particular, the large spacings between repetitions effect an impairment of the performance, and since the method according to the present invention avoids such large spacings, the application of the method according to the present invention is advantageous.

The repetition method according to the present invention, therefore, can be used to generate virtually optimum repetition patterns when the rate matching is applied downstream of the first interleaver. The method is not particularly complicated in this case, especially as it need be applied only once per radio frame, and not for each bit.

Although the present invention has been described with reference to specific embodiments, those of skill in the art will recognize that changes may be made thereto without departing from the spirit and scope of the present invention without departing from the hereafter appended claims. It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for transmitting data frames, the method being performed by a rate converter and comprising the steps of:
   distributing data that are transmitted as bits over a set of frames via an interleaver; and
   carrying out a repetition process for repeating bits in order to generate a bit repetition pattern, for purposes of data rate matching, the repetition process being carried out after the interleaving such that the bit repetition pattern prevents spacing between two arbitrary consecutive repeated bit from being substantially greater than a mean repetition spacing, the spacing relating to a sequence of the bits at a point upstream of the interleaver,
   wherein a repetition rate used for the repetition process is not an integral fraction,
   wherein a displacement of the bit repetition pattern to frames is performed in accordance with a relative displacement of a next lower repetition rate that is an integral fraction,
   wherein the frames have a duration of 10 ms, and the interleaving is carried out over a plurality of frames, the number of frames being a power of two, and
   wherein the displacement of the bit repetition pattern is determined with the aid of a puncturing rate, the puncturing rate being equal to a multiple of 100% minus the repetition rate, and the puncturing rate being in a range from 0% inclusive to 100% exclusive.

2. A method for transmitting data frames as claimed in claim 1, wherein the displacement of the bit repetition pattern is determined with the aid of a puncturing rate.

3. A method for transmitting data frames as claimed in claim 2, wherein the displacement of the bit repetition pattern is determined with the aid of a puncturing rate if the corresponding puncturing rate is in a range of between 0% and 50% inclusive.

4. A method for transmitting data frames as claimed in claim 1, wherein the displacement S(k) of the bit repetition pattern to a frame k is obtained via:
   calculation of a signed mean repetition spacing:

---

R = (Ni−Nc) mod Nc−
where, x is mod Nc in the range from 0 to Nc − 1, that is to say −1 mod 10 = 9, and
    if R ≠ 0 and 2*R ≤ Nc
        then q = |Nc/1 |
else
q = | Nc / (R − Nc) |
endif
if q is
    even, then
        q' = q + lcd( | q |, F) / F − lcd ( | q |, F)2
signifying the greatest common divisor of | q | and F, where
        q' is not a whole number, but a multiple of 1/8 or a multiple of 1/F;
    else
    q'=q
    endif
calculation of S(k), the displacement of the column k:
    for k = 0 to F − 1
        S(RF ([ | ⌊k*q'⌋ | mod F])) = ( | ⌊k*q'⌋ div F)
        -- RF(k) is an inversion of a column exchange
        operation of the interleaver;
    end for.

---

5. A method for transmitting data frames as claimed in claim 1, wherein the bits represent binary numbers.

6. A method for transmitting data frames as claimed in claim 1, wherein the repetition process for repeating bits comprises a repetition process for puncturing bits.

* * * * *